UNITED STATES PATENT OFFICE.

WILLIAM L. VOELKER, OF ELKO, VIRGINIA, ASSIGNOR, BY MESNE ASSIGNMENTS, TO THE STERLING INCANDESCENT GAS LIGHT COMPANY, OF WEST VIRGINIA.

FILAMENTARY HOOD OR GRATING.

SPECIFICATION forming part of Letters Patent No. 546,792, dated September 24, 1895.

Application filed September 19, 1894. Serial No. 523,503. (No specimens.)

*To all whom it may concern:*

Be it known that I, WILLIAM L. VOELKER, a citizen of the United States, and a resident of Elko, in the county of Henrico and State of Virginia, have invented certain new and useful Improvements in Filamentary Hoods or Gratings Used for Incandescent Gas-Lighting and Processes for Operating the Same, of which the following is a specification.

My invention relates to that form of gas-burning device known as the "incandescent gas-lamp," in which there is suspended over and embracing the flame a filamentary hood, grating, or mantle of substance adapted to become incandescent under the heat of the gas-flame. The chief difficulty in the way of the successful application of this mode of illumination is the fact that to derive a high efficiency in light from the incandescent hood it is essential that the hood shall have a small amount of mass and a large amount of radiating-surface. This is realized in an eminent degree by making the hoods with a number of fine threads or filaments woven, knitted, or put together by other mechanical means, so as to form a net-like structure of the desired shape. When the best structural arrangement is realized for obtaining the maximum illumination from the minimum consumption of gas, there is encountered the difficulty of handling the hood or mantle from the fact that all such structures are made of elements possessing very little mechanical strength, because only materials that have a very low specific heat are of any value for the purpose, such as the oxides of the metals and, preferably, those of the alkalies and the earths proper, so called by the chemist.

To overcome the difficulties heretofore met with in the manufacture and utilization of filamentary incandescent gas-hoods or mantles I construct an article whose sustaining-frame consists of porcelain or porcelanous compound, adding thereto in any suitable manner an incandescing-substance, as by impregnation or incorporation, and bringing the lamp to a finished, hard, and refractory condition by baking. This result may be attained in one of several ways, and I will describe two methods heretofore successfully employed by me, the composite parts of the finished structure and the processes employed in its manufacture being varied somewhat, but each one employing a frame or structure of porcelanous material, covered or impregnated by an incandescing-substance and reduced to a commercial and marketable condition by the baking process.

The following is one method of carrying my invention into effect: I take of kaolin sixty parts, quartz twenty parts, feldspar twenty parts. These materials I grind to an impalpable powder, and when in such condition combine with such mass so produced an equal portion of a saturated solution of sugar sirup, which after being thoroughly mixed will form a mass from which threads or filaments having great tensile strength can be made. These filaments can be formed in any suitable manner, after which they are woven, knitted, or combined in any mechanical way to produce the desired shape or structure. After this skeleton-structure is thoroughly dry it is baked at a high temperature in a suitable oven. After this it is dipped in a strong or saturated solution of the salts of the metals to be used for their incandescing properties, subsequent to which they are oxidized by the proper chemical reagents—heat or electricity.

In lieu of the above I may as a modification of my invention incorporate the oxides with the porcelanous material while the latter is still in the powdered state. In this case the saccharine matter is added at the same time. In this case, also, the method and operation would be substantially as follows: I take, say, twenty per cent. of the porcelanous material reduced to an impalpable powder, as heretofore stated, and combine with said porcelanous material forty-five parts of light oxide of magnesia, ten parts zirconia oxide, five parts chromium oxide, and twenty parts of dense sugar sirup. These materials are thoroughly combined and mixed and reduced to a mass of the consistency of putty. Such mass can be formed into threads or filaments, as hereinbefore stated, in respect to the other method, and such filaments may be woven or otherwise combined in any suitable shape or structure of a hood or mantle. After such structure or structures have been thoroughly dried they are placed in a proper oven and baked and are then ready for use.

It will be understood that the basic idea of my present invention consists, essentially, of the proper formation of the porcelanous structure, combined with one or more oxides incorporated with the porcelanous material, before it is formed into the shape desired, either by mixing or by impregnation afterward, as described in the other process.

The above proportions may be modified from time to time, as experience may dictate. The porcelain body is employed for strength and is used for a vehicle to hold the incandescing particles of matter. In other words the "porcelain biscuit," so-called by potters, being a porous body, is rendered more porous or cellulous by the oxidizing of the saccharine matter.

In the first of the processes described by me the porous porcelain skeleton has its coral-like structure sufficiently covered with myriads of small crystals of the oxides or salts of the metals, held there by chemical means first, then when baked again by mechanical means. In the second process, although the porcelain mass has added to it a light-giving oxide, the porcelain structure is still the supporting-frame and the chemical combination under the influence of heat takes place just the same; but in the latter process it is modified by the incorporation of the oxide of magnesia in such a manner that the shrinkage is not so great at a given temperature; but after numerous experiments I have demonstrated that the final result is approximately the same in respect to light-giving qualities.

I do not claim the use of any of the metallic oxides that become incandescent at a high temperature, as they are well known to chemical science; but

Having thus described my invention, what I claim, and desire to secure by Letters Patent, is—

1. A porcelanous incandescent gas lamp mantle having a filamentary body or frame work incorporated with an incandescing substance and brought to a finished hard and refractory condition by baking.

2. A porcelainized web or woven mantle of an incandescent oxide for an incandescent gas lamp.

WILLIAM L. VOELKER.

Witnesses:
   D. WILEY BAKER,
   HARRY W. HARRIS.